Nov. 7, 1961  J. D. BREWIN  3,007,288
PRODUCTION OF POLISHED BEVELS ON GLASS PLATES
Filed Dec. 15, 1958  5 Sheets-Sheet 1

Inventor
J. D. Brewin

By
Morrison, Kennedy + Campbell Attorneys

Nov. 7, 1961 J. D. BREWIN 3,007,288
PRODUCTION OF POLISHED BEVELS ON GLASS PLATES
Filed Dec. 15, 1958 5 Sheets-Sheet 2

Inventor
J. D. Brewin
By
Morrison, Kennedy & Campbell Attorneys

Nov. 7, 1961 J. D. BREWIN 3,007,288
PRODUCTION OF POLISHED BEVELS ON GLASS PLATES
Filed Dec. 15, 1958 5 Sheets-Sheet 5

Inventor
J. D. Brewin
By
Morrison Kennedy & Campbell Attorneys

3,007,288
PRODUCTION OF POLISHED BEVELS ON GLASS PLATES

John D. Brewin, St. Helens, England, assignor to Pilkington Brothers Limited, Liverpool, England, a company of Great Britain
Filed Dec. 15, 1958, Ser. No. 780,364
Claims priority, application Great Britain Dec. 16, 1957
8 Claims. (Cl. 51—110)

This invention relates to the production of polished bevels on glass plates.

In the production of polished bevels along the straight edges of glass plates, it is usual to continually advance the plate in a substantially vertical plane through grinding, smoothing and polishing stations so that the edge to be bevelled moves in a horizontal path past rotating tools at the several stations to be worked progressively thereby.

The operation of smoothing the ground bevels of a glass plate prior to polishing them involves the removal of a few thousandths of an inch of glass from the bevel and the smoothing tools if of a diameter of about 10" revolves at a rate of about two thousand revolutions per minute, the linear speed of the glass plate being from about 16" to about 48" per minute.

In one well known form of such apparatus the grinding, smoothing and polishing tools are each of cup form and the annular face or rim of each cup, being the operative surface, is presented to the margin of the glass plate, the axis of the tool being tilted so that the plane of the flat annular face of each tool is inclined to the plane of the glass plate at an angle desired for the bevel.

In such apparatus the tools of cup form having a diamond impregnation abrasive surface usually have an outside diameter for the annular abrasive face of about 10", and a width of the annulus of about ⅝", and are rotated at a rate which gives a linear speed for the abrasive face of about five thousand feet per minute.

As the plate is moved through the machine the margin is operated on by these tools of cup form, which are placed in series so that the margins of the plates become successively ground, smoothed, and polished.

For the frinding and smoothing operations the tools may be of the usual bonded abrasive materials of appropriate increasingly finer grits, or they may be of the diamond-abrasive type in which the active face consists of a bonding material impregnated with diamond dust of appropriate particle-size, the bonding material and the particle-size of the diamond dust being chosen according to the work to be done.

In operation the whole of the outer periphery or edge of the annular abrasive face is constantly meeting the advancing unpolished glass. When the tool is new and the annular face is truly flat this edge tries to take off the whole few thousandths of an inch of glass which the tools have to remove to effect the smoothing operation, so the edge wears more quickly than the inner parts of the annulus until the whole face of the tool has assumed a very slightly conical shape, after which the whole width of the annulus bears upon the glass as the latter is advanced against it.

The present invention involves a novel principle in the mounting or the form of the tools of cup form in which the effective radius of the abrasive face of the tool varies during each revolution of the tool.

During each revolution of the tool the variation in the length of radius from the centre of rotation to the point of abrasive contact between the tool and the glass results in a variation in the direction of that radius. The direction of abrasion is always at right angles to the radius from the centre of rotation to the point of abrasion; hence the direction of abrasion varies during each revolution of the tool. Thus instead of a uni-directional abrasion whch tends to deepen and accentuate the lines of abrasion imparted by the tool to the surface of the glass, there is a crossing or "cross-hatching" effect in these lines which effectively breaks them up, minimising their depth and makng them more easily obliterated in the subsequent polishing operation.

Apparatus for surfacing (e.g. carrying out one of the operations in the group consisting of grinding, smoothing and polishing) a flat bevel along the margin of a plate of glass constructed in accordance with the present invention comprises for the surfacing operation a rotatable tool including a ring-like abrading surface, the arrangement being such that during operation the portion of the surface being used for abrasion is at a radius from the centre of rotation of the tool, which radius is gradually varying the maximum variation in the effective radius being about equal to the width of the abrading surface, means for driving the tool, means for presenting the glass margin to the operative area of the abrading surface, the axis of rotation of the tool being disposed so that the abrading surface is set at an inclination to the plate to produce in the surfacing operation a bevel surface at the predetermined inclination to the surface of the plate.

Apparatus embodyng the invention preferably includes a linear series of the tools progressively arranged so that a limited amount of work is required from each whereby the surfacing operation is gradually effected at successive stations.

The tools constructed in accordance with the invention may be mounted in relation to a holder for a circular glass plate in an apparatus of the known kind in which a rotatable shaft upon which a glass plate is supported is constantly rotated so that the circular glass plate may overlap the several tools as the plate rotates for treatment thereat and the tools at each station may be operated as a group.

For producing a flat bevel along one straight margin of glass plate such apparatus may comprise guiding means by which the plate is advanced, supports for the glass being associated with the guide to retain the plate in a desired inclination to the vertical and the tools may be mounted in individual housings which are provided with bearings for shafts on which the tools are mounted, each shaft being independently driven from a respective motor so that the speeds of the tools may be precisely regulated individually to assure the desired progressive treatment of the bevel.

The tools may comprise an abrasive surface of elliptical form and may revolve about an axis coincident with the axis of symmetry of the ellipse.

Alternatively apparatus according to the invention may comprise a tool of which the perimeters of the abrading surfaces of the tool are concentric circles and the tool is mounted eccentrically in respect of its axis of rotation, the throw of the eccentric may be at least as great as half the width of the abrading surface, and a guide for the glass plate may be provided to direct the plate past the operative area of the tool.

Conveniently the tools are of the usual cup form presenting an annular abrasive face to the glass but are mounted slightly off centre, that is the centre of the annular abrasive face of the tool is slightly displaced from the centre of rotation of the tool. To assure smooth action of the tool a counterbalance may be provided of adjustable nature to balance the offset tool, and may be made adjustable so that its effect can be reduced as the face of the tool wears away.

Experiments have shown that when polishing a bevel which has been smoothed with tools mounted in accordance with the invention, the amount of polishing needed is only about half of that needed when polishing after smoothing with an ordinary concentrically mounted circular tool of cup form.

In operation the largest radius of the abrasive face of tools according to the invention is constantly meeting the advancing ground glass so that only those parts of the abrasive surface at the largest radius wear conical, and the rest of the face remains flat, and this results in the area of the bevel that is being smoothed being rubbed by the flat portion of the abrasive face after the initial attack by the conically worn portions. Thus the harsh initial attack on the glass by the parts of the abrasive face that are at the largest radius of distance from the centre of rotation is followed by a kinder smoothing by those parts which are at smaller radius.

The effect of constant advance and retreat of the point of attack on the glass gives the liquid coolant a much better chance to penetrate to the whole area of abrasive contact between the face of the tool and the glass. This helps to prevent dry spots between the two and the consequent "firing" which causes rough grinding marks on the glass.

Provided the variation of radius is at least as great as the width of the annular abrasive face of the tool, each point of the glass is benig abraded during only a part of each revolution of the tool. During the remainder of each revolution it is untouched and is flooded with coolant. Thus the attacked surface of the glass does not become as hot as when a circular concentrically mounted tool is employed.

In order that the invention may be more clearly understood some preferred embodiments thereof will now be described, by way of example, with reference to the accompanying drawings, in which:

FIG. 1 is a diagrammatic side elevation view of a machine for grinding, smoothing and polishing bevels on the edges of glass sheets, FIG. 2 is a view partly in section to an enlarged scale of the eccentrically mounted smoothing wheel used in the machine shown in FIG. 1, FIG. 3 is a plan view of the smoothing wheel as shown in FIG. 2, FIG. 4 is a view partly in section showing the action of the smoothing wheel on the ground bevel edge of a glass sheet, in the machine shown in FIG. 1, FIG. 5 is a view to an enlarged scale of another form of smoothing wheel for use in the machine shown in FIG. 1.

In the drawings like reference numerals indicate the same or similar parts.

Figure 1:
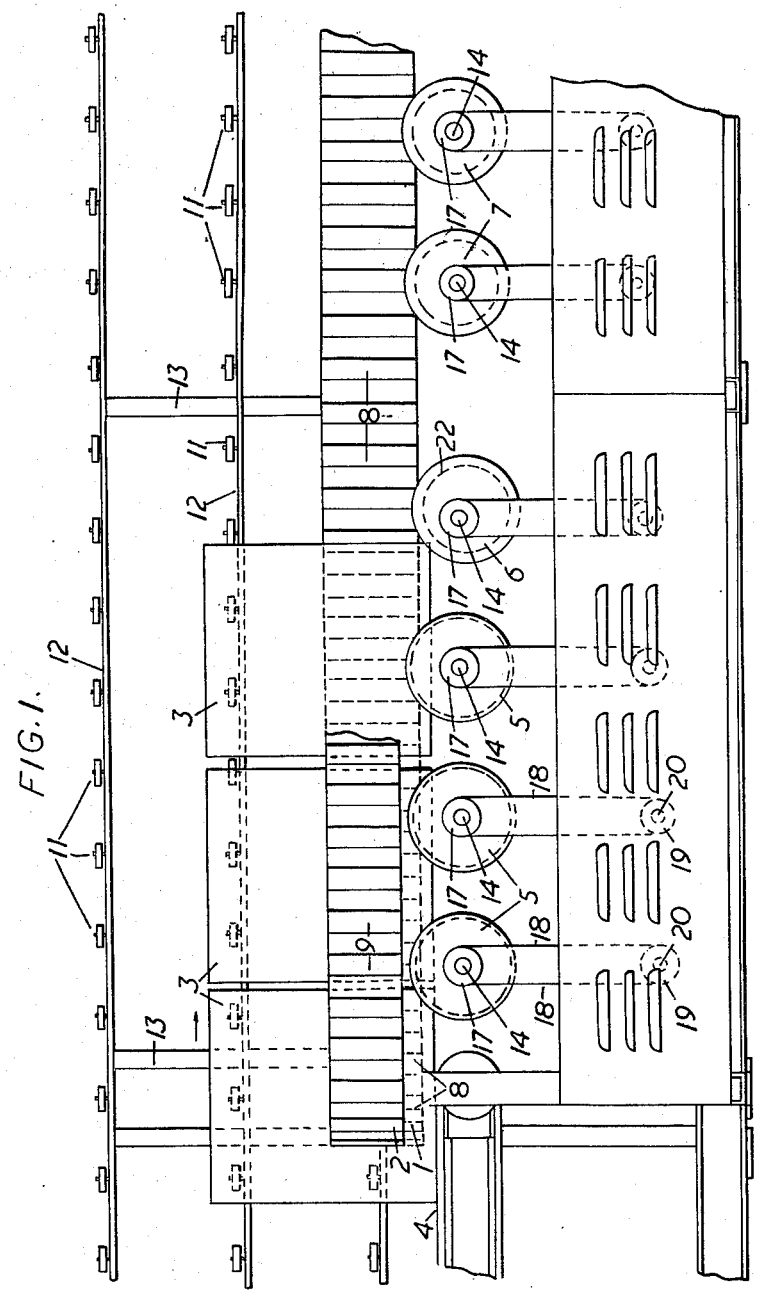

Referring to the drawings the machine comprises a pair of parallel, vertically inclined, opposed co-operating conveyors 1, 2 travelling in a horizontal direction between which conveyors glass sheets 3, fed into the machine on belt 4, are gripped and successively advanced past grinding tools indicated generally at 5, an eccentric smoothing tool indicated generally at 6 and polishing tools indicated generally at 7. The operative faces of the conveyors 1, 2 are constituted by a series of articulated pads, 8 and 9 respectively.

The conveyors 1, 2 are each maintained under tension between driving rolls carried on spindles mounted on the framework of the machine so as to be inclined to the vertical at the required ultimate bevel angle. The pads of the conveyor 2 are urged by spring pressure towards the pads of the conveyor 1 in known manner so that the glass sheets are resiliently gripped between the conveyors. The faces of the pads are constructed of resilient material, e.g. rubber, so as to be capable of firmly holding the glass sheets and guiding and advancing them at a uniform rate past the tools 5, 6, 7 against the retarding forces created by the pressure of the tools against the sheet, yet without marking the surfaces of the sheets.

Conveyor 2 is of less width than conveyor 1, in order to expose the lower edge 10 of the glass sheets, which constitute the edges to be bevelled, to the action of the surfacing tools.

Rows of freely rotatable rollers 11 are mounted on horizontal cross-members 12 attached to uprights 13 rising from the framework of the machine and inclined at the same angle to the vertical as the driving roll spindles and the advancing glass sheets. These rollers, serve to prevent the glass sheets from leaning over under the lever action of weight of the upper part of the sheets not gripped by the conveyors, and so support the sheets at the desired inclination. With the glass sheets shown only the lower row are employed but with taller sheets the upper row come into play also.

Referring now to the surfacing tools, each tool is driven by a horizontal shaft 14 journalled in bearings 15 in a housing 16, one end of the shaft carrying the surfacing tool and the other end a pulley 17 connected by a belt drive 18 to a pulley 19 on the driving shaft 20 of an adjustable speed motor (not shown). The rates of rotation of the surfacing tools may thus be individually precisely regulated.

The grinding tools 5 are of conventional construction comprising cup-shaped discs having an annular abrading surface and bolted symmetrically around the periphery of the circular flange formed at the end of the driving shaft so that the cup axis coincides with the driving shaft axis.

Figure 2:
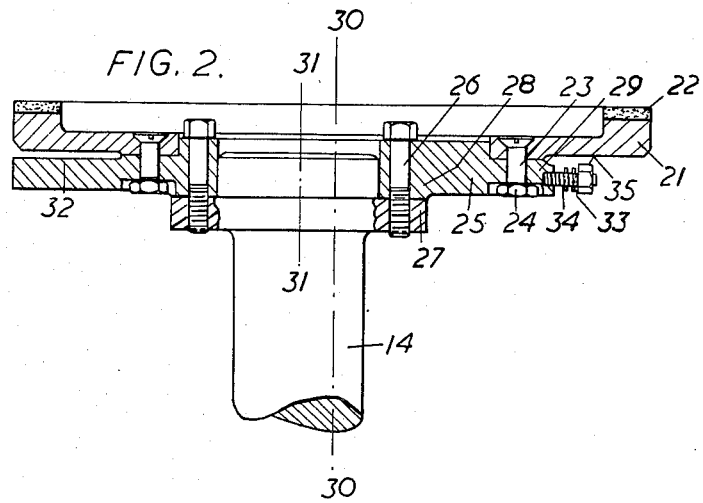
Figure 3:
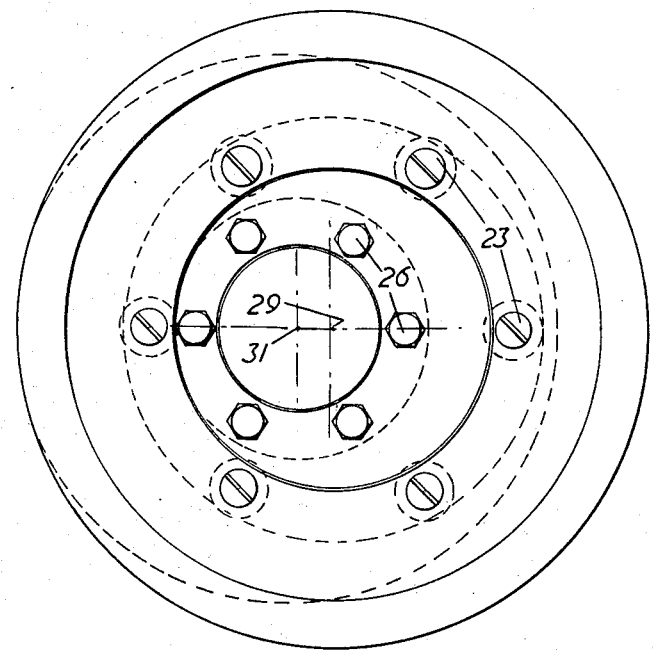
Figure 4:
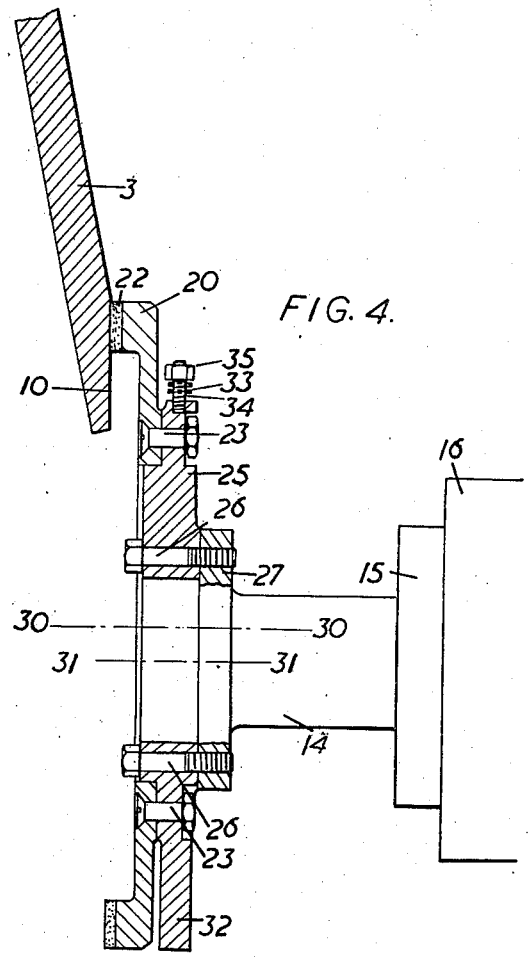

As shown in detail in FIGS. 2, 3 and 4, the smoothing tool 6 comprises a circular disc 21 having an annular diamond-impregnated abrading surface 22 and secured by bolts 23 co-operating with nuts 24 to a counter-balanced adaptor plate 25. Adaptor plate 25 is secured to the driving shaft by bolts 26 having threaded ends engaging in tappings in the flanged end 27 of driving shaft 14, the bores 28 in the adaptor plate through which the bolts 26 pass lying on a circle having its centre offset with respect to the circle on which lie the bores 29 through which the bolts 23 pass. The amount of offset is comparable to the width of the abrading surface. As a result of this construction, the axis of the disc 21, shown at 30—30, does not coincide with the axis of the driving shaft, shown at 31—31, but is displaced therefrom so as to provide an eccentric mounting of the smoothing disc. Furthermore, the amount of offset and the width of the annular abrading surface 21 are mutually chosen so that the width of the annulus is less than the width of the ground bevel 10 and so that any chord of the annulus always overlies the bevel surface being treated. The adaptor plate is provided with an adjustable counterbalance 32, in order to compensate for the offset mounting of the disc, the effect of which may be adjusted by varying a number of weights 33 threaded on a stud 34 and retained thereon by a nut member 35.

Polishing tools 7 are again, like the grinding tools 5, of conventional construction and each comprises a cup-shaped circular disc having an annular abrading surface and mounted so that the axis of the disc coincides with that of the respective driving shaft. The abrading power of the polishing tools is of course less than that of the smoothing tool, which in turn is less than that of the grinding tools owing to the progressively gentler surface working required at the three stages, as will be well understood. However, within the individual grinding and/or polishing stages consecutive wheels may be of progressively lower abrading power.

In operation the glass sheets are thus advanced past the grinding, smoothing and polishing tools consecutively, at a uniform rate whereby the bevels produced on the lower edges of the sheets by the grinding tools 5, are smoothed by the smoothing tool 6 and finally polished by the polishing tools 7, the employment of the novel form of variable radius smoothing tool according to the invention, in which the point of attack of the abrading surface on the rough bevel moves backwards and forwards enabling a considerable saving in the amount of work required subsequently by the polishing tools. The actual bevel angle is determined by the inclination of the conveyors, as the surfacing tools move in vertical planes, being mounted on horizontal driving shafts, the angle shown in FIG. 4 being about 11°.

Figure 5:
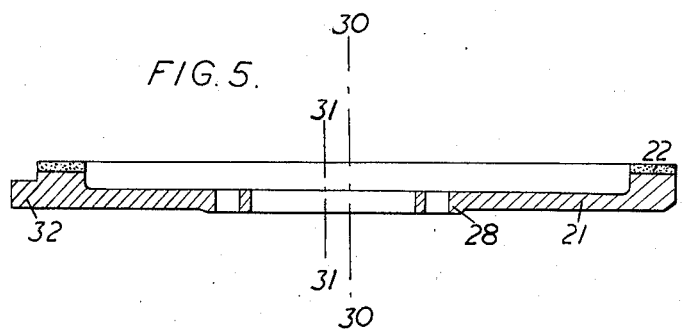
Figure 6:
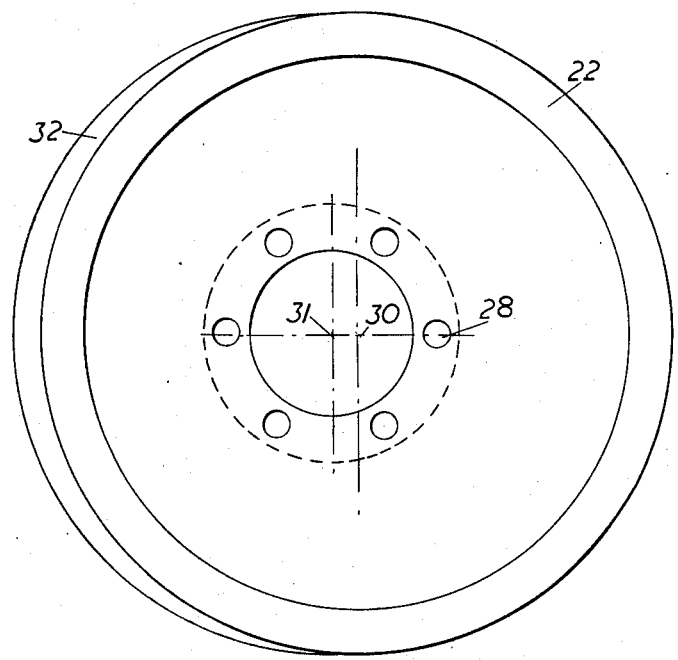
FIG. 6 is a plan view of the smoothing wheel as shown in FIG. 5.

FIGURES 5 and 6 show a modified form of balanced smoothing tool comprising a generally circular disc 21 having an annular abrading surface 22, and including bores 28 through which pass bolts securing it directly to the flanged end of the driving shaft. The bores 28 are disposed about a circle having its centre offset from the axis 30—30 of the disc, and hence the disc axis is offset from the axis 31—31 of the driving shaft, as clearly shown in FIGURE 6, the amount of offset again being comparable to the width of the annular abrading surface. By positioning the bores in the disc asymmetrically, as in this construction, the interposed adaptor plate may be dispensed with. The base of the disc is shaped so as to flare outwardly from that side of the disc towards which the bores 28 are offset, in order to provide a counter balance 32.

Figure 7:
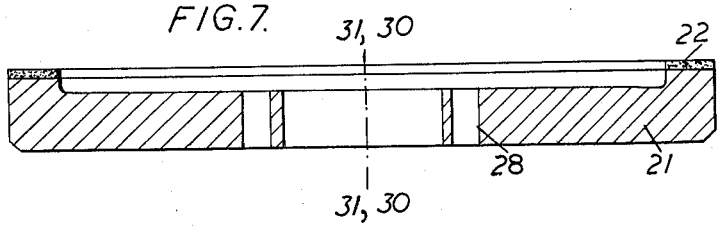
FIG. 7 is a view to an enlarged scale of a still further form of smoothing wheel for use in the machine shown in FIG. 1.
Figure 8:
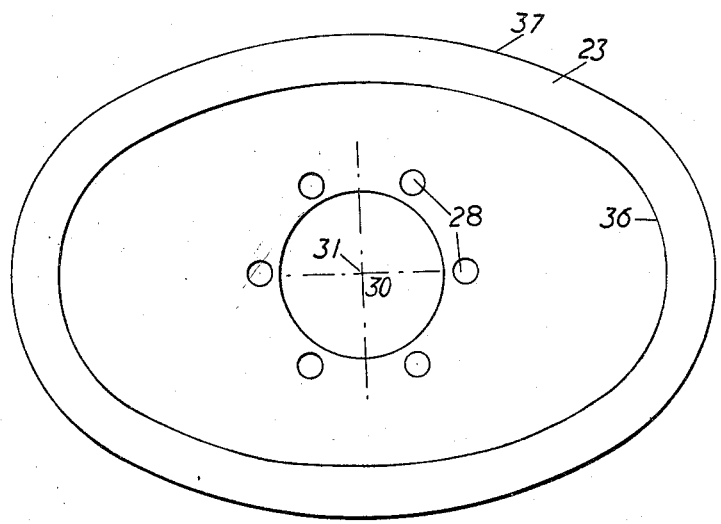
FIG. 8 is a plan view of the smoothing wheel as shown in FIG. 7.

FIGURES 7 and 8 show a still further form of smoothing tool in which the effect of variable radius, and hence of constant advance and retreat of the point of attack is achieved by making the smoothing disc of oval form and symmetrically securing it to the flanged end of the driving shaft, i.e. securing it to the driving shaft so that the axis 30—30 of the disc coincides with the axis 31—31 of the driving shaft, as clearly shown in FIG. 8. The variable radius is hence constituted by the variable radius vector of the oval. The abrading surface 22 in this form is again of annular shape, being defined by the inner and outer ellipses 36 and 37, whilst the width of this surface is comparable to the difference between the major and minor axes of the ellipses, and the bores 28 are disposed on a circle having its centre coincident with the common centre of the ellipses 36—37.

As the abrading surface of the tool wears down, particularly if the wear is not generally even over the whole surface, undesirable results may occur due to the resultant out of balance of the tool necessitating resetting its balance. This can be avoided without losing the advantage of a constant variation in the direction of the abrasion, by reducing the said eccentricity so that any out of balance of the tool due to wear of the abrading surface will be immaterial and thus one set balance would last for the life of the tool. To this end the maximum variation of the effective radius of the abrading surface can be of smaller dimension than the width of the abrading surface and the full traverse of the abrading surface is then effected by superimposing an additional radial movement thereto by imparting a supplementary movement to the means for driving the tool. With this in mind a tool presenting an annular abrading surface to the glass, is mounted with the centre of the abrading surface slightly displaced from the centre of rotation of the tool, as in FIGS. 2, 3, 5 and 6, said displacement being less than half the width of the abrading surface; alternatively when the abrading surface is of elliptical form mounted to revolve about an axis coincident with the axis of symmetry of the ellipse, as in FIGS. 7 and 8, the difference between the major and minor axes of the ellipses is made less than the width of the abrading surface; in either case the full traverse of the abrading surface is effected by imparting a movement to the tool transversely of its axis of rotation through a distance such that the maximum variation in the effective radius of the abrading surface is about equal to the width of the abrading surface. Such transverse movement of the tool can be effected by mounting the rotating tool on a rotating crank.

Although in the machine shown in FIG. 1 only one smoothing tool is incorporated, two or more may be provided by installing additional motors and driving shafts in the machine according to the quality of finish required.

Additionally, the grinding and/or polishing tools may be constructed so as to provide abrading surfaces of variable radius in the manner herein described for a smoothing tool, in which case the smoothing tools may be of conventional construction or of variable radius construction as herein described.

By means of the present invention, not only may the production of a polished bevel be rendered much quicker, but also the bevelling machine may be rendered more economical to operate, in that for example fewer tools for polishing are required subsequent to smoothing by tools constructed in accordance with the present invention, owing to the greater smoothing efficiency of the tools.

I claim:

1. Apparatus for performing one of the operations of grinding, smoothing and polishing a bevel along the margin of a plate of glass, the apparatus comprising a rotatable tool having a ring-like abrading surface, means for supporting a plate of glass and continuously presenting the margin of the glass plate to the abrading surface, means for rotating the abrading surface of the tool across the edge of the glass plate at an angle to the surface of the plate to produce a bevel at a predetermined inclination to the surface of the plate, said rotating means including means for continuously changing the direction of movement of the abrading surface as the abrading surface meets the edge of the plate of glass.

2. Apparatus according to claim 1 including a series of tools, the supporting means presenting the margin of the glass plate to the abrading surface of each of the tools, whereby a polished bevel is gradually obtained by operations at successive stations.

3. Apparatus according to claim 2 wherein the series of tools is a linear series, the supporting means comprises guiding means for advancing the glass plate, and cross-members for retaining the glass plate in a desired inclination to the vertical while engaged by the guiding means, and an individual housing is provided for each tool, each housing being provided with bearings for shafts on which the tools are mounted, and each shaft being independently driven so that the speeds of the tools may be precisely regulated individually to assure the desired progressive treatment of the bevel.

4. Apparatus according to claim 2, further comprising common driving means for operating the series of tools as a group.

5. Apparatus according to claim 1, wherein the ring-like abrading surface is defined by concentric circles mounted eccentrically on the tool in respect of the axis of rotation of the tool, the throw of the eccentric being greater than half the width of the abrading surface, and a guide for the glass plate to direct the plate past the operative area of the tool.

6. Apparatus according to claim 1 wherein the ring-like abrading surface is defined by ellipses having common axes and mounted on the rotatable tool with the axis of rotation of the tool coincident with the axes of symmetry of the ellipses.

7. Apparatus for performing one of the operations of grinding, smoothing and polishing a bevel along the margin of a plate of glass, the apparatus comprising a linear series of rotatable tools, each tool having a ring-like abrading surface, an individual housing for each tool including bearings for the shaft on which the tool is mounted, means for driving each shaft independently, means for supporting a plate of glass and continually presenting the margin of the glass plate to a plurality of the abrading surfaces, the supporting means comprising guiding means for advancing the glass plate and cross members for retaining the glass plate in a desired inclination to the vertical while engaged by the guiding means, and means for rotating the abrading surfaces of the tools across the edge of the glass plate at an angle to the surface of the plate to produce a bevel at a predetermined inclination to the surface of the plate, one of the tools having a ring-like abrading surface defined by concentric circles mounted eccentrically in respect of the axis of rotation of the tool whereby the direction of movement of the abrading surface of the tool having the eccentric mounting is continuously changed as the abrading surface meets the edge of the plate of glass, the throw of the eccentric being greater than half the width of the abrading surface.

8. Apparatus for performing one of the operations of grinding, smoothing and polishing a bevel along the margin of a plate of glass, the apparatus comprising a linear series of rotatable tools including ring-like abrading surfaces, an individual housing for each of the tools, each housing including bearings on which the tools are mounted, means for driving each shaft independently, one of the tools having a ring-like abrading surface defined by concentric ellipses mounted to revolve about the axis of the tool, the difference in the lengths of the major and minor axes of the ellipses being greater than half the width of the abrading surface, means for supporting a plate of glass and continuously presenting the margin of the glass plate to a plurality of the abrading surfaces, the said supporting means comprising guiding means for advancing the glass plate and cross members for retaining the glass plate in the desired inclination to the vertical while engaged by the guiding means, and means for rotating the abrading surfaces of the tools across the edge of the glass plate at an angle to the surface of the plate to produce a bevel at a predetermined inclination to the surface of the plate, the abrading surface defined by the concentric ellipses providing means for continuously changing the direction of movement of the abrading surface of that tool as the abrading surface meets the edge of the glass plate.

References Cited in the file of this patent

UNITED STATES PATENTS

| | | |
|---|---|---|
| 2,195,057 | Wallace | Mar. 26, 1940 |
| 2,214,361 | Burroughs | Sept. 10, 1940 |
| 2,272,651 | Waldron | Feb. 10, 1942 |
| 2,423,118 | Ramsay | July 1, 1947 |
| 2,539,107 | Sectish | Jan. 23, 1951 |
| 2,578,789 | Donnelly | Dec. 18, 1951 |
| 2,597,182 | Rickner | May 20, 1952 |
| 2,629,975 | Desenberg | Mar. 3, 1953 |
| 2,754,956 | Sommer | July 17, 1956 |
| 2,788,619 | Touvay | Apr. 16, 1957 |
| 2,909,871 | Heymes | Oct. 27, 1959 |